Sept. 26, 1950 E. LABIN 2,523,311

COUPLING MEANS BETWEEN RADIO STAGES

Filed Oct. 7, 1947

INVENTOR.
EMILE LABIN

BY Robert Harding Jr.
ATTORNEY

Patented Sept. 26, 1950 2,523,311

UNITED STATES PATENT OFFICE 2,523,311

COUPLING MEANS BETWEEN RADIO STAGES

Emile Labin, New York, N. Y., assignor to International Standard Electric Corporation, New York, N. Y., a corporation of Delaware Application October 7, 1947, Serial No. 778,446
In France July 29, 1939

Section 1, Public Law 690, August 8, 1946
Patent expires July 29, 1959

27 Claims. (Cl. 332—43)

The present invention concerns coupling circuits for electronic discharge devices, and more particularly means of coupling between an energizing stage and an energized stage for a system of transmission of modulated electric waves.

When a stage comprising an electronic discharge device is modulated, the charge of the energizing stage varies, and the result is, generally, variations in the energizing potential. These variations are normally harmful inasmuch as they are opposed to the modulation.

One object of the invention is, consequently, to provide means to eliminate the harmful effect of such variations in the energizing potential on the modulation of the energized stage.

Another object of the invention is to provide means to render useful, and not harmful to modulation, such variations in the potential of the energizing stage.

Another object of the invention is to provide means to compensate a non-linearity of the modulated stage.

A circuit for coupling an energizing stage to an energized stage incorporating the present invention comprises a transformer which reverses the direction of variation of the impedances of the energizing stage with regard to the energized stage. In such a modulator system, the variation in the charge of the energizing stage will produce a variation in the energizing potential which will help the modulation in the energized stage and this variation may be provided in such a way that it helps the modulation and even compensates the non-linearities due to characteristic curves of the modulated stage.

In accordance with one characteristic of the invention, a modulated stage is connected to its energizing stage by a network, arranged and dimensioned in such a way as to reverse the variations in the impedance offered by the energized stage to the energizing stage.

According to another characteristic of the invention, this impedance inverter network consists of a transformer, of the so-called quarter wave type, that is to say constituted by a transmission line whose length is equal to a quarter of a wave or an odd multiple of a quarter of the operating carrier frequency wave.

The invention will be shown in detail in the following description given with relation to the attached drawings in which:

Fig. 1 represents an example of an application of the invention in the case of a transmission system in which the energization is carried out by the grids and which is modulated by the variations in the bias on the grids.

Figure 1:
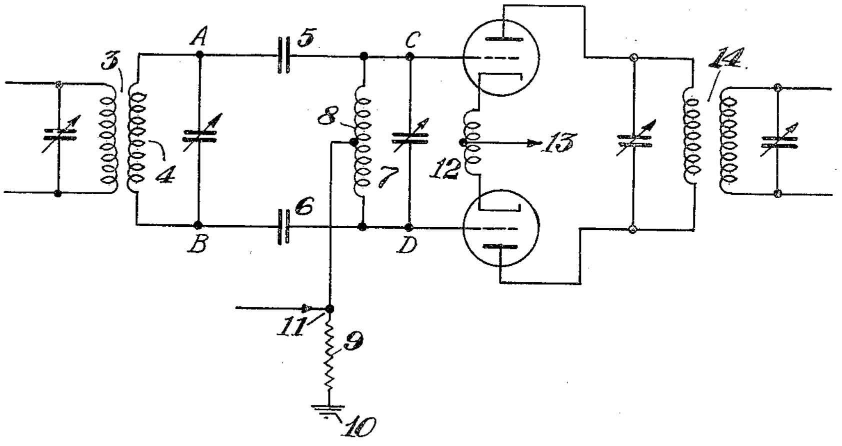
Fig. 1 shows diagrammatically a transmission circuit incorporating a coupling circuit in accordance with the invention.

On this figure, only the energized stage is shown, which comprises two electron discharge tubes 1 and 2, operating in the well-known push-pull arrangement, and the coupling circuit to the energizing stage.

This coupling circuit between the energizing stage and the energized stage consists of a tuned transformer 3 of which the secondary winding and its tuning capacity are designated by 4. This tuned secondary winding 4 is a part of a quadripole ABCD composed of two series capacitances 5 and 6 and one shunt impedance 7, consisting of an inductance in shunt with one capacity.

The output terminals C and D of the quadripole are connected respectively to the control grids of the tubes 1 and 2. The modulation is applied to the grids by means of the connection at the midpoint 8 of the inductance forming part of the shunt impedance 7 of the quadripole to a resistance 9 one end of which is earthed at 10, and to the other end of which variations in bias are applied as indicated at 11.

The filaments or cathodes of the tubes 1 and 2 are joined by a neutrodynation impedance 12 and supplied by a heating circuit 13. The plates of the tubes 1 and 2 are connected to the two terminals of the primary winding of a tuned output transformer 14.

The anti-resonant circuit 7 is adjusted in such a way as to have an equivalent value equivalent to that of the anti-resonant circuit 4, each of the capacitances 5 and 6 is taken at a value half of that of the identical reactance of the circuits 4 and 7, and is obviously of opposite sign to that of the reactances 4 and 7. Under these conditions, the quadripole ABCD reverses the impedances, so that the energizing stage finds at the terminals AB an impedance which is the reverse of that which exists between the terminals C and D.

The adjustment of the quadripole ABCD may moreover be effected simply, in the following way: The terminals C, D are short circuited, and the tuning of the variable capacity of the impedance 4 is adjusted. Consequently the short-circuit on the terminals C, D is removed, and is placed on the terminals AB. Then the tuning of the variable capacity of the impedance 7 is adjusted. The short circuit on the terminals A, B is then removed and the quadripole is thus adjusted. If the impedance between the terminals C and D is R, the impedance perceived between A and B will be $R'=X^2/R$. The transformation ratio of the network ABCD may thus be easily adjusted by modifying the series capacities 5 and 6.

When the modulation is effected on the terminal 11, as shown, the impedance R between C and D changes due to the variation in the consumption of the grids. When for example, the bias of the tubes 1 and 2 is increased with a view to decreasing the plate current at the output, the impedance R increases because the grid consumption decreases, and due to the network ABCD the resistance R' between the input terminals A and B decreases, which causes a decrease in the energizing potential on the grids of the tubes 1 and 2, with the result that the energizing variation thus produced, is in the direction which is favourable to modulation instead of being detrimental, as would have been the case if the inverter circuit ABCD did not exist.

The customary non-linearity of the modulation due to variation in energizing potential, is thus, not only eliminated, but again, it may be of opposite direction to its customary direction, with the result that in choosing a rather weak energizing source and a suitable transformation ratio, that is to say, a reactance value X, non-linearities due to characteristic curves of the tubes 1 and 2 may be compensated.

It must be understood that the invention is obviously not limited to the embodiment of Fig. 1, but that any form of impedance inverter circuit may be employed to couple an energizing stage to an energized stage.

Figure 2:
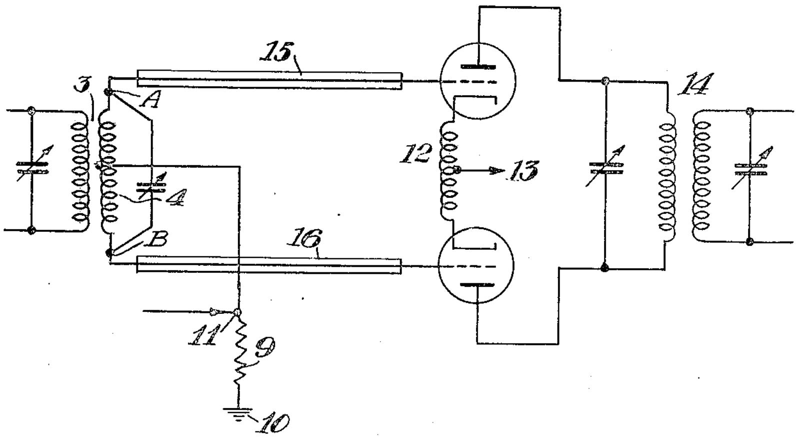
Fig. 2 shows diagrammatically a transmission circuit incorporating coupling lines of a quarter of a wave, in accordance with the invention.

The quadripole ABCD may, for example, as shown on Fig. 2, consist of a real transmission line of the type known as quarter wavelength, and which operates as an impedance inverter transformer in the well-known manner. In the example of the embodiment diagrammatically shown in Fig. 2, the same reference numbers as in Fig. 1 have been given to the same elements. The quadripole ABCD is replaced by two coaxial lines 15 and 16 which connect the grids of the tubes 1 and 2 to the energizing stage.

Moreover, the invention is evidently not limited to a modulator system in which the modulation and energization are carried out by the grids, but may equally be applied to other cases of connection between stages, for example, the modulation can be made by variation of the plate potential, instead of being made by variation in the grid potentials of the tubes. It is moreover, evident that tubes of all types, and of any number of electrodes may be employed in the energized stage and not only merely the triodes which have been shown for the sake of simplicity of the diagrams.

Still other modifications and adaptations of the invention will be apparent to the technician without departing from its scope.

What is claimed is:

1. In a modulator, in combination, an energizing stage, an energized stage means for applying a modulating potential to said energized stage, and means coupling said energizing stage to said energized stage, said coupling means including a four-terminal network composed of essentially reactive shunt and series arms designed to be an impedance transformer of the type wherein the input impedance varies inversely as the load impedance.

2. In a modulator, the combination according to claim 1 wherein said network has a shunt reactance substantially equal in magnitude and opposite in phase to its series reactance.

3. In a modulator, the combination according to claim 2 wherein said network is of the longitudinally unsymmetrical type and has two substantially identical series arms and one shunt arm.

4. In a modulator, the combination according to claim 3 wherein a coupling impedance is connected across the input terminals of said network.

5. In a modulator, the combination according to claim 4 wherein said coupling impedance is a reactance substantially equal to the shunt reactance of the network.

6. In a modulator, the combination according to claim 5 wherein said coupling reactance and said shunt reactance each comprise an inductance shunted by a condenser.

7. In a modulator, the combination according to claim 6 wherein the two series arms of the network each comprise a condenser.

8. In a modulator, the combination according to claim 7 wherein said means for applying a modulating potential comprise a source of variable voltage and a connection between said source and a point on the shunt inductance of said network.

9. In a modulator, the combination according to claim 8 wherein at least the condensers shunting said inductances are adjustable.

10. In a modulator, in combination, an energizing stage having an output circuit, an energized stage having input and output circuits, interstage coupling means including an impedance connected across the output circuit of said energizing stage, means connecting said impedance across the input circuit of said energized stage, said last means including an impedance transformer having an input impedance which effectively shunts said coupling impedance and is arranged to vary inversely as the input impedance of said energized stage, and means for varying the input impedance of said energized stage.

11. In a modulator, the combination according to claim 10 wherein said last means comprise a source of modulating voltage and means connecting said source to the input circuit of said energized stage.

12. In a modulator, the combination according to claim 10 wherein said input impedance comprises the apparent grid-cathode resistance of a vacuum tube.

13. In a modulator, the combination according to claim 10 wherein said coupling impedance comprises the secondary of a transformer.

14. In a modulator, the combination according to claim 13 wherein said secondary is shunted by a variable condenser.

15. In a modulator, the combination, an energizing stage having an output circuit, an energized stage comprising a pair of push-pull connected vacuum tubes each having an anode and two input electrodes including a grid and a cathode, interstage coupling means including an impedance connected across the output circuit of said energizing stage, means interconnecting two corresponding input electrodes of said vacuum tubes, means connecting said impedance across the remaining two input electrodes of said tubes, said last means including an impedance transformer having an input impedance which effectively shunts said coupling impedance and is arranged to vary inversely as the input impedance of said energized stage, and means for varying the apparent grid-cathode resistances of said two tubes.

16. In a modulator, the combination according to claim 15 wherein said last means comprises a source of modulating voltage and means connecting said source in parallel across the input electrodes of each tube.

17. In a modulator, the combination according to claim 15 wherein said impedance transformer comprises an essentially reactive four-terminal network.

18. In a modulator, the combination according to claim 15 wherein said impedance transformer comprises a pair of transmission lines each of substantially a quarter wave length at the operating frequency of said energizing stage.

19. A modulating arrangement comprising a driver stage, having an output circuit, a mixer stage including a vacuum tube having a cathode, a grid and an anode, means for operating said vacuum tube at a non-linear portion of its characteristic in the region of grid current flow, interstage coupling means including an impedance connected across the output circuit of said driver stage, means connecting said impedance across the grid-cathode circuit of said mixer stage, said last means including an impedance transformer having an input impedance which effectively shunts said coupling impedance and is arranged to vary inversely as the grid-cathode impedance of said mixer stage, and means for varying the operating point of said vacuum tube.

20. A modulating arrangement comprising a driver stage having an output circuit, a mixer stage comprising a pair of push-pull connected vacuum tubes each having an anode, a grid and a cathode, means interconnecting the two cathodes, a transformer having its primary connected across the output circuit of said driver stage, a four terminal network of the type wherein the input impedance varies inversely as the load impedance, said network having its input terminals connected across the secondary of said transformer and having its output terminals connected between the two grids of said tubes, means for operating said vacuum tubes at a non-linear portion of their characteristic in the region of grid current flow, and means for varying the operating point of said vacuum tubes.

21. The modulating arrangement according to claim 20 wherein said four-terminal network has a series reactance equally distributed over its two series arms and a shunt reactance substantially equal in magnitude and opposite in phase to said series reactance.

22. The modulating arrangement according to claim 21 wherein said transformer secondary is shunted by a condenser and the effective reactance of said secondary in combination with said condenser substantially equals in magnitude and phase the shunt reactance of said network.

23. The modulating arrangement according to claim 22 wherein the shunt reactance of said network is represented by the parallel combination of an inductance and a capacitance.

24. The modulating arrangement according to claim 23 wherein the means for varying said operating point include a source of modulating potential and means connecting said source to the mid-point of the shunt inductance of said network.

25. A modulating arrangement comprising a driver stage having an output circuit, a mixer stage comprising a pair of push-pull connected vacuum tubes each having an anode, a grid and a cathode, means interconnecting the two cathodes, a transformer having its primary connected across the output circuit of said driver stage, a pair of coaxial transmission lines each having its inner conductor connected between a respective terminal of the secondary of said transformer and the grid of a respective tube, means connecting the outer conductors of said transmission lines to the cathodes of said tubes, the length of each transmission line being substantially a quarter wave length at the operating frequency of said driver stage, means for operating said vacuum tubes at a non-linear portion of their characteristic in the region of grid current flow, and means for varying the operating point of said vacuum tubes.

26. The modulating arrangement according to claim 25 wherein said last means include a source of modulating potential and means connecting said source to the mid-point of said secondary.

27. The modulating arrangement according to claim 25 wherein said secondary is shunted by a variable condenser.

EMILE LABIN.

REFERENCES CITED

The following references are of record in the file of this patent:

UNITED STATES PATENTS

| Number | Name | Date |
|---|---|---|
| 2,211,003 | Conklin | Aug. 13, 1940 |
| 2,259,658 | Parker | Oct. 21, 1941 |
| 2,301,160 | Finch | Nov. 3, 1942 |

FOREIGN PATENTS

| Number | Country | Date |
|---|---|---|
| 542,226 | Great Britain | Dec. 31, 1941 |